Dec. 27, 1966   P. S. EMERY, JR   3,293,711
HITCH
Filed Aug. 18, 1965
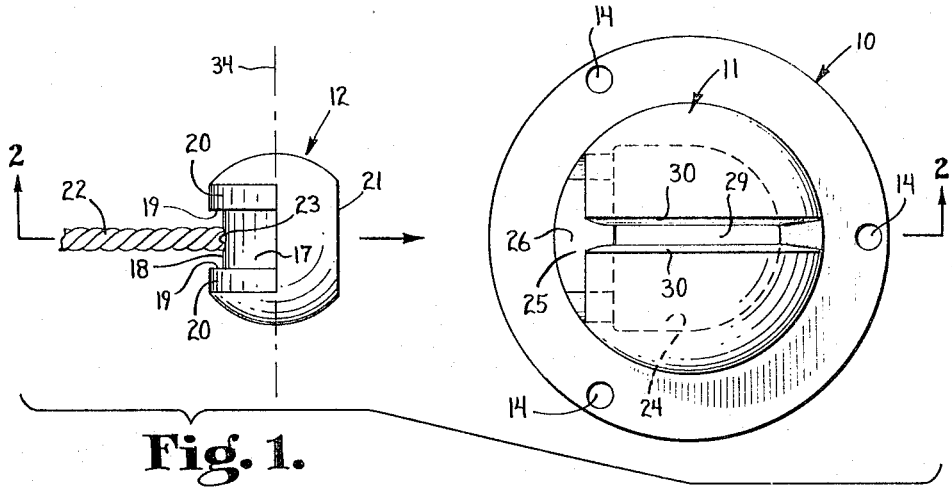
Fig. 1.
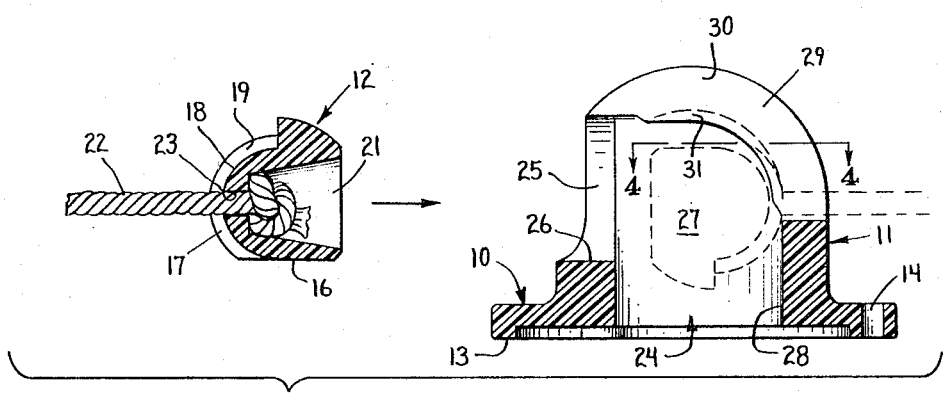
Fig. 2.
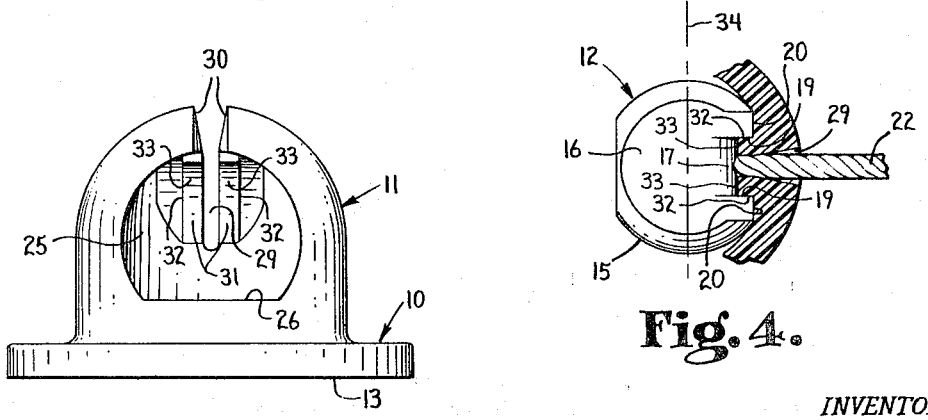
Fig. 3.
Fig. 4.
INVENTOR.
PARFITT S. EMERY, JR.
BY Hood, Gust & Irish
Attorneys 3,293,711
HITCH
Parfitt S. Emery, Jr., 200 N. 3rd St., Elwood, Ind. 46036
Filed Aug. 18, 1965, Ser. No. 480,727
4 Claims. (Cl. 24—128)

The present invention relates to improvements in cable anchors, and more particularly to a device for securing an end of a cable to a mounting surface while allowing the cable to swing freely in a plane relative to the mounting surface.

A primary object of the invention is to provide a cable anchor wherein a cable may swivel freely without bending and without chafing against the anchor. Another primary object is to provide a cable anchor which will prevent an accidental dislodgement of a cable therefrom.

A further object of the invention is to provide a cable anchor or mount which will facilitate the engagement and disengagement of a cable. Further objects are to provide a cable anchor which is strong in proportion to its size and weight, one which can absorb large shocks imparted to it from the cable coupled to it, and one which can be easily and inexpensively manufactured.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

FIG. 1 is a top view of a cable anchor constructed in accordance with the present invention, showing a cable in position to be coupled thereto;

FIG. 2 is a side view in cross section of the cable anchor, taken along the line 2—2 of FIG. 1;

FIG. 3 is a front view of the shell and mounting base of the cable anchor; and

FIG. 4 illustrates the engagement of the keeper element and the shell of the cable anchor; it is a fragmentary top view in cross section taken along the line 4—4 of FIG. 2.

Referring more particularly to the drawings, it may be seen that the cable anchor consists of three major elements: a mounting base 10, a shell 11 extending therefrom, and a keeper element 12. In a preferred embodiment of the cable anchor, all three elements are formed of a suitable plastic by injection molding; this embodiment also contemplates an integral mounting base 10 and shell 11 so that both of these elements may be manufactured in a single injection molding operation.

The mounting base 10 has a lower surface 13 and a number of holes 14 for the purpose of affixing the cable anchor to a desired mounting surface, such as a wall or a boat deck.

The keeper element, indicated generally by the reference numeral 12, is here shown as a substantially spherical ball, although other shapes having an axis of substantial symmetry 34, such as, for instance, a cylinder or a double cone, are possible and might be more desirable in certain applications. In a preferred embodiment of the keeper element, the exterior surface 15 has a chordal flat 16 and a diametral groove 17 extending from the chordal flat 16 for substantially 180° around the keeper element. This groove 17 consists of a floor 18, lateral walls 19, and flats 20. The keeper element 12 is provided with a socket 21 adapted to hold a suitably enlarged end of a cable 22 therein; the cable 22 emerges from the socket 21 through a hole 23 which opens through the floor 18 of the groove 17.

The shell, indicated generally by the numeral 11, extends from the mounting base 10. A first purpose of the shell is to receive the keeper element 12 therein, and to permit the keeper element to be disengaged therefrom, only when the keeper element bears a specified orientation relative to the shell; namely, the orientation shown in solid lines in FIG. 1 and in FIG. 2. Secondly, the shell 11 is designed so that, once the keeper element 12 has been introduced thereinto, it is free to swivel in the plane of FIG. 2; furthermore, the keeper element cannot then become disengaged from the shell unless it is returned to the same relative orientation from which it was introduced, regardless of any slack in the cable 22.

To these ends, the shell 11 is provided with an interiorly extending cavity, indicated generally by the reference numeral 24. The cavity 24 communicates with the exterior of the shell via a mouth 25 whose size and shape in the plane of FIG. 3 are the same as those of the keeper element 12 in the same plane. As may be appreciated, the chordal table surface 26 of the mouth 25 cooperates with the corresponding chordal flat 16 to permit the keeper element 12 to be introduced into and removed from the cavity 24 only in the relative orientation illustrated in FIGS. 1 and 2. When the keeper element is within the cavity 24, even a slight rotation relative to the shell 11 will produce a camming action between the chordal flat 16 and the chordal table surface 26 sufficient to prevent the disengagement of the keeper element under a tension exerted by the cable 22. At the same time, however, the shape of the keeper element facilitates its introduction into the mouth 25, since the keeper element tends to align itself with the mouth 25 when it is urged thereinto from an approximately correct relative orientation.

An interior portion 27 of the cavity 24 is shaped generally to correspond to the exterior surface 15 of the keeper element 12, allowing the keeper element to rotate freely in the plane of FIG. 2. The portion 28 of the cavity 24 has no role in the operation of the cable anchor; rather its purpose is to facilitate the manufacturing of the cable anchor. A diametral slot 29 provided in the shell 11 communicates with the cavity 24; this slot, running in the plane of FIG. 2 from the mouth 25 through the greater part of 180° therefrom, has a width sufficient to allow passage of the cable 22. The sides 30 of the slot 29 are angled slightly outward in order to reduce chafing of the cable 22 as it moves within the slot.

In the cable anchor as thus far described, tension on the cable 22 tends to spread apart the sides 30 of the slot 29, leading to an ultimate fracture of the shell 11 unless the shell is excessively reinforced. Therefore, an inwardly disposed rib 31 is provided adjacent each side of the slot 29. These ribs 31 project into the cavity 24 and extend for substantially the entire length of the slot 29. When the keeper element 12 engages the shell 11 in a position such as that shown in FIG. 4 and in dotted lines in FIG. 2, the remote side walls 32 of the ribs 31 fit snugly against the lateral walls 19 of the diametral groove 17, thus preventing the spreading of the slot 29 even under a large amount of tension from the cable 22. To enhance the effect of this feature, the cooperating parts are dimensioned so that the flats 20 abut the surface of the cavity 24, and the surfaces 33 of the ribs 31 abut the floor 18 of the groove 17. The addition of the ribs 31 and groove 17 obviates the necessity for reinforcements in the shell 11, and allows the shell to be made of material resilient enough to absorb large shocks imparted to it by the cable 22 without fracturing.

It will of course be appreciated that the above-described embodiment of the shell 11 is designed for applications in which it is desired that the cable 22 be free to swing primarily in a plane perpendicular to the plane of the surface on which the cable anchor is to be mounted, and that the design of the shell may be easily modified for applications in which the cable should be free to swing through a large angle in some other plane, including a plane parallel to that of the mounting surface. It will also be appreciated that the cross-section of the exterior surface 15 of the keeper element 12 in the plane of FIG. 3, and the corresponding cross section of the cavity 24, may be modified substantially without changing the operation of the cable anchor, and that ribs 31 and corresponding grooves 17 in addition to those shown may be provided to further increase the resistance of the shell 11 to lateral spreading.

I claim as my invention:
1. A cable anchor, comprising
 a keeper element having an axis of substantial symmetry and having a socket therein for holding an end of a cable perpendicular to said axis of substantial symmetry,
 a mounting base, and
 a shell extending from said mounting base,
  said shell being provided with a cavity extending thereinto adapted to receive said keeper element and to allow it to rotate about its axis of substantial symmetry through approximately 180° and
  said shell being further provided with a diametral slot communicating with said cavity for passage of a cable therethrough,
  said diametral slot being provided with an inwardly disposed rib adjacent each side thereof, and
  said keeper element being provided with a diametral groove adapted to receive said inwardly disposed ribs with the lateral walls of said groove snugly embracing the remote side walls of said ribs when said keeper element is introduced into said cavity.
2. The cable anchor of claim 1, in which
 said cavity is formed with a mouth provided with a chordal table surface, and in which
 said keeper element is provided with a corresponding chordal flat.
3. The cable anchor of claim 1, in which
 said socket opens through the floor of said diametral groove.
4. The cable anchor of claim 1, in which
 said keeper element is a spherical ball, and in which
 said cavity is a domed cylinder adapted slidingly to receive said spherical ball.

References Cited by the Examiner
UNITED STATES PATENTS

| | | |
|---|---|---|
| 76,706 | 4/1868 | Brevoort. |
| 407,559 | 7/1889 | Wells. |
| 651,637 | 6/1900 | Nicol. |
| 1,493,285 | 5/1924 | Scafe. |
| 1,636,090 | 7/1927 | Erickson. |
| 1,666,272 | 4/1928 | Spiering. |
| 1,690,745 | 11/1928 | Mickelson. |
| 2,215,023 | 9/1940 | White. |
| 2,226,502 | 12/1940 | Platt _____ 24—116 |
| 2,234,602 | 3/1941 | McIntosh. |
| 2,293,251 | 8/1942 | Fords _____ 211—119.1 |

BERNARD A. GELAK, *Primary Examiner.*